US012769126B2

(12) United States Patent
Aida et al.

(10) Patent No.: US 12,769,126 B2
(45) Date of Patent: Oct. 20, 2026

(54) IMAGE DISPLAY APPARATUS

(71) Applicant: CANON KABUSHIKI KAISHA, Tokyo (JP)

(72) Inventors: Tomohisa Aida, Tochigi (JP); Yosuke Sakai, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 419 days.

(21) Appl. No.: 18/448,999

(22) Filed: Aug. 14, 2023

(65) Prior Publication Data

US 2024/0094540 A1 Mar. 21, 2024

(30) Foreign Application Priority Data

Sep. 14, 2022 (JP) ................................. 2022-146057

(51) Int. Cl.
*G02B 27/00* (2006.01)
*G02B 27/01* (2006.01)

(52) U.S. Cl.
CPC .. *G02B 27/0172* (2013.01); *G02B 2027/0123* (2013.01); *G02B 2027/0178* (2013.01)

(58) Field of Classification Search
CPC ........ G02B 27/0172; G02B 2027/0123; G02B 2027/0178; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116;
(Continued)

(56) References Cited

U.S. PATENT DOCUMENTS 10,969,675 B1 * 4/2021 Wheelwright ..... G02B 27/0172
11,561,461 B2 1/2023 Aida
(Continued)

FOREIGN PATENT DOCUMENTS

JP 2019534478 A 11/2019
JP 2021056278 A 4/2021

OTHER PUBLICATIONS

Notice of Reasons for Refusal issued by the Japanese Patent Office on Jun. 2, 2026 in corresponding JP Patent Application No. 2022-146057, with English translation.

*Primary Examiner* — Henry Duong
(74) *Attorney, Agent, or Firm* — Carter, DeLuca & Farrell LLP

(57) ABSTRACT

An image display apparatus includes a light source, an image generating element, a light guide element, and a light guide unit. The light guide element has a first surface and a second surface opposite to the first surface, and the image generating element is disposed to face the second surface of the light guide element. The light from the light source enters the first surface, transmits through the light guide element and the light guide unit, and enters the image generating element to be converted into the image light, and the image light transmits through the light guide unit and enters the second surface. A distance between an exit surface of the image generating element for emitting the image light and an incident surface of the light guide unit which the image light enters is longer than 0 mm and equal to or shorter than 5 mm.

16 Claims, 14 Drawing Sheets

(58) Field of Classification Search
CPC ...... G02B 2027/0118; G02B 2027/012; G02B 2027/0121; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0169; G02B 2027/0167; G02B 2027/0174; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
USPC .......................................................... 359/630
See application file for complete search history.

(56) References Cited

U.S. PATENT DOCUMENTS

| | | | | |
|---|---|---|---|---|
| 2022/0269075 | A1* | 8/2022 | Yang .................. | G02B 27/0103 |
| 2025/0155715 | A1* | 5/2025 | Shimizu ............. | G02B 27/0172 |

* cited by examiner

PRIOR ART

IMAGE DISPLAY APPARATUS

BACKGROUND

Technical Field

One of the aspects of the embodiments relates to an image display apparatus that enables an observer to observe an image.

Description of Related Art

An image display apparatus having a light guide plate has conventionally been known. FIG. 18 is a conceptual diagram of light beams propagating in a light guide plate in a conventional image display apparatus. The light beams from the image generating element enter a first deflector 1, are deflected, and then are propagated through a light guide plate 3 by total reflection. Part of the light beams incident on a second deflector 2 is deflected toward a pupil SP of an observer, and another part is reflected, is propagated through the light guide plate 3 by total reflection, and enters the second deflector 2. This configuration emits a plurality of light beams from the second deflector 2 and expands an area in which the observer can observe the light beams. U.S. patent Ser. No. 10/969,675 discloses a configuration that places a light guide plate between Micro Electro Mechanical Systems (MEMS) and an optical system in order to reduce the size of the image display apparatus.

U.S. patent Ser. No. 10/969,675 discloses the configuration that reduces the size of the image display apparatus but does not disclose the condition for realizing a wide angle of view. In a case where a distance between the MEMS and the light guide plate is not properly set, the field of view will become very narrow.

SUMMARY

An image display apparatus according to one aspect of the embodiment includes a light source, an image generating element configured to convert light from the light source into image light, a light guide element configured to guide the image light to an observer, and a light guide unit configured to guide the image light to the light guide element. The light guide element has a first surface and a second surface opposite to the first surface, and the image generating element is disposed to face the second surface of the light guide element. The light from the light source enters the first surface, transmits through the light guide element and the light guide unit, and enters the image generating element to be converted into the image light, and the image light transmits through the light guide unit and enters the second surface. A distance between an exit surface of the image generating element for emitting the image light and an incident surface of the light guide unit which the image light enters is longer than 0 mm and equal to or shorter than 5 mm.

Further features of the disclosure will become apparent from the following description of embodiments with reference to the attached drawings.

DESCRIPTION OF THE EMBODIMENTS

Figure 1:
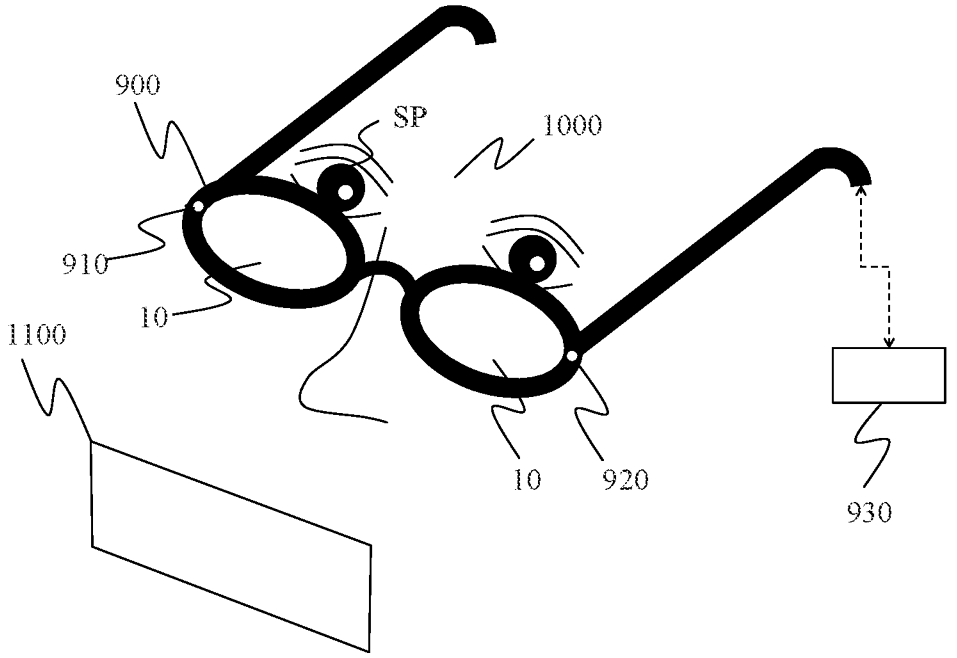
FIG. 1 is a schematic diagram of an example of an image display apparatus according to one embodiment of the present disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 is a schematic diagram of an example of an image display apparatus according to one embodiment. The image display apparatus according to this embodiment includes light guide plates 10, a frame 900, a first acquiring unit 910, a second acquiring unit 920, a control unit 930, and an image generating element (not illustrated). The image display apparatus enables an observer 1000 to visually recognize a display image 1100 through the light guide plates 10.

The first acquiring unit 910 includes, for example, an image pickup apparatus such as a camera, and acquires at least one of position information and viewpoint information of the observer 1000. The position information of the observer 1000 is information about the position of at least part of the user, for example, information about the position of the pupil SP of the observer 1000. The viewpoint information of the observer 1000 is information about the viewpoint and line of sight (visual line) of the observer 1000, and is information about the movement of the pupil SP of the user, for example. By acquiring the position information of the user, the first acquiring unit 910 can detect a displacement amount of the position of the pupil SP of the observer with respect to the image generating element. Based on the information acquired by the first acquiring unit 910, the control unit 930 can correct a relative positional shift between the image generating element and the pupil SP of the observer 1000.

The second acquiring unit 920 includes, for example, an image pickup apparatus such as a camera, and acquires external world information (surrounding information). The second acquiring unit 920 can detect the brightness (luminance) of the external world by acquiring the external world information. The control unit 930 can display the display image 1100 with proper luminance to the observer 1000 based on the information acquired by the second acquiring unit 920. The brightness of the display image 1100 can be arbitrarily determined by the observer 1000 operating the control unit 930 without depending on the information acquired by the second acquiring unit 920.

The image generating element converts light from a light source into image light. The image generating element may be positioned for each eye or for a single eye. The image generating element disposed for each eye can give a parallax to the displayed image and enable the observer 1000 to stereoscopically view the display image 1100.

The control unit 930 may be located outside or inside the frame 900. In a case where the control unit 930 is located outside the frame 900, the connection between the control unit 930 and the frame 900 may be wired or wireless.

Example 1

Figure 2:
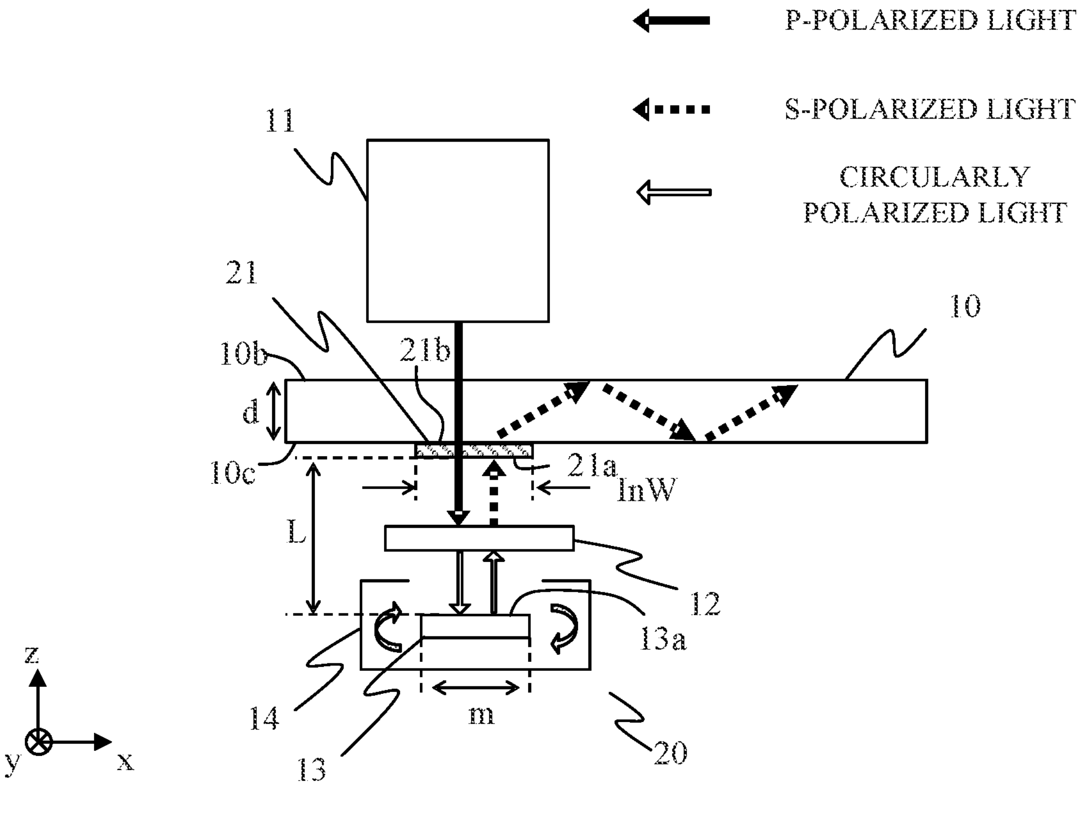
FIG. 2 explains optical paths in the image display apparatus according to Example 1.
Figure 3A:
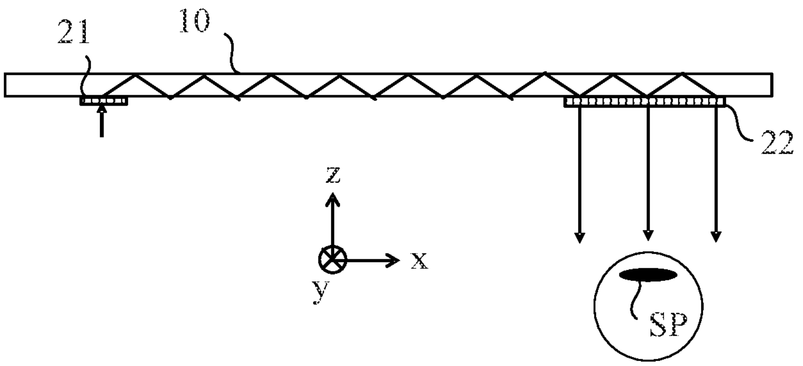
FIGS. 3A and 3B are configuration diagrams of the image display apparatus according to Example 1.
Figure 3B:
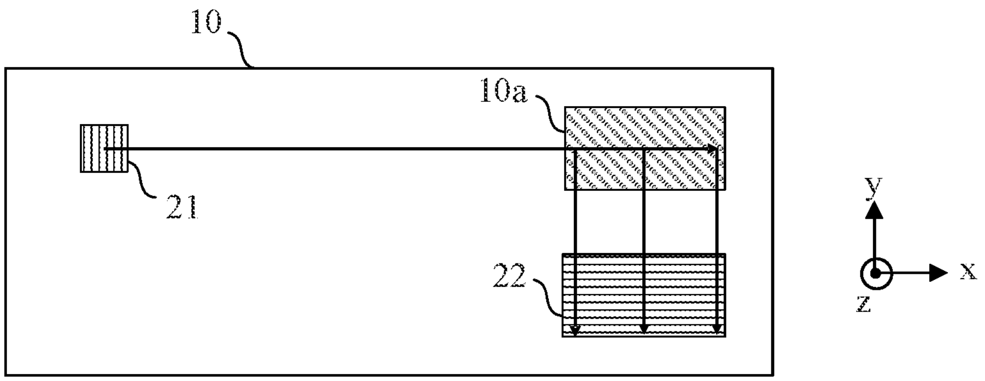

FIG. 2 is a configuration diagram of an image display apparatus according to this example. FIGS. 3A and 3B explain optical paths in the image display apparatus according to this example. The image display apparatus according to this example includes a light guide plate 10, a light source 11, a quarter waveplate 12, an incident deflector (light guide unit) 21, an exit deflector 22, and MEMS 20. In this example, the incident deflector 21 and the exit deflector 22 are coupled to the light guide plate 10.

Figure 4:
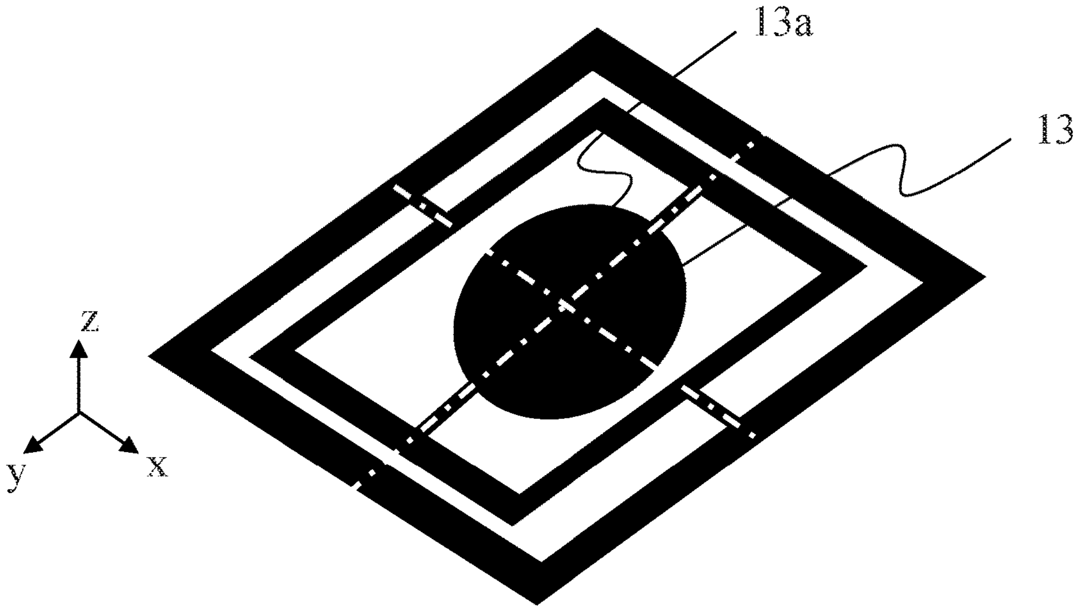
FIG. 4 illustrates a structure of MEMS.
Figure 5A:
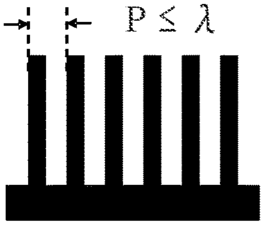
FIGS. 5A, 5B, 5C, and 5D are configuration diagrams of incident deflectors.
Figure 5B:
Figure 5C:
Figure 5D:

The quarter waveplate 12 is a waveplate configured to give a phase difference of $\lambda/4$. The MEMS 20 includes a mirror 13 configured to reflect incident light and an exterior (protective member) 14 configured to protect the mirror 13, and is a two-dimensional scan type mirror for raster scanning in which the mirror 13 swings about the x-axis and y-axis set around the center of the mirror 13 as an axis, as illustrated in FIG. 4. A light beam emitted from the light source 11 transmits through the light guide plate 10, the incident deflector 21, and the quarter waveplate 12, and enters the MEMS 20. This example uses the MEMS 20 as an example of the image generating element, but may use another element.

A light beam (image light) emitted from the MEMS 20 is deflected by the incident deflector 21 and propagates inside the light guide plate 10 by total reflection. The light beam incident on a light beam splitting deflector 10*a* provided on the light guide plate 10 is deflected while being split in the x-axis direction and guided to the exit deflector 22. The light beam incident on the exit deflector 22 is deflected while being split in the y-axis direction, and is emitted to the pupil SP. Here, in this example, the direction (x-axis direction) deflected by the incident deflector 21 and the direction (y-axis direction) deflected by the beam splitting deflector 10*a* are orthogonal to each other, each deflector may deflect the light beam at a different angle as long as the light beam incident on the light guide plate 10 can be exited to the pupil SP.

FIGS. 5A, 5B, 5C, and 5D are configuration diagrams of the incident deflector 21. The incident deflector 21 includes a diffraction element having a grating structure P finer than the wavelength $\lambda$ of the light beam emitted from the light source 11, and has optical anisotropy due to polarization, as illustrated in FIGS. 5A, 5B, 5C, and 5D. In this example, the incident deflector 21 has a characteristic (polarization selectivity) that transmits P-polarized light and diffracts S-polarized light. In this example, the light beam emitted from the light source 11 is P-polarized light and transmits through the incident deflector 21 without being diffracted by the incident deflector 21. The efficiency and diffraction angle for each diffraction order can be controlled by changing the shape, height, refractive index, etc. of the grating structure, and can be determined according to the requirements of the image display apparatus. The incident deflector 21 is a diffractive optical element in this example, but may be a holographic element as long as it has anisotropy due to the light deflecting action and polarization.

The P-polarized light that has transmitted through the incident deflector 21 is reflected by the mirror 13 and enters the incident deflector 21 again. Due to the quarter waveplate 12 located between the incident deflector 21 and the MEMS 20, the P-polarized light that has transmitted through the incident deflector 21 is inverted by 90 degrees in phase before re-entering the incident deflector 21, and becomes S-polarized light. The light beam that has re-entered the incident deflector 21 as S-polarized light is diffracted by the incident deflector 21 and propagated through the light guide plate 10 by total reflection.

Figure 6B:
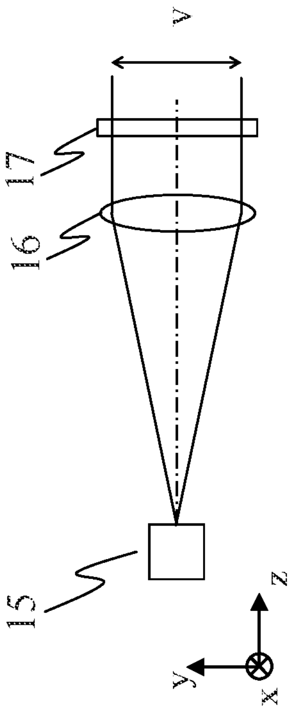
FIGS. 6A, 6B, and 6C are configuration diagrams of a light source.
Figure 6A:
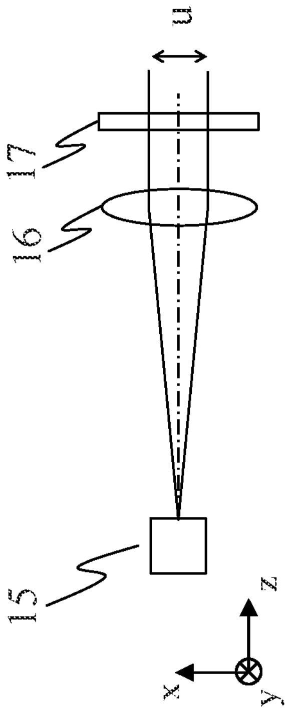
Figure 6C:
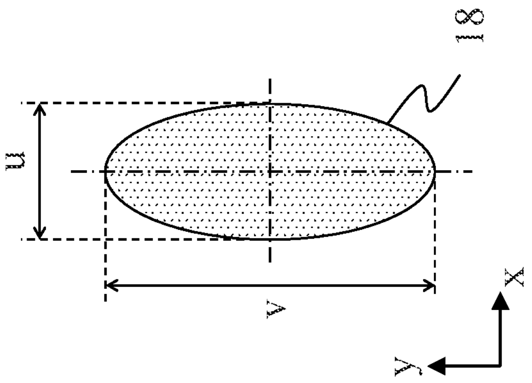
Figure 7:
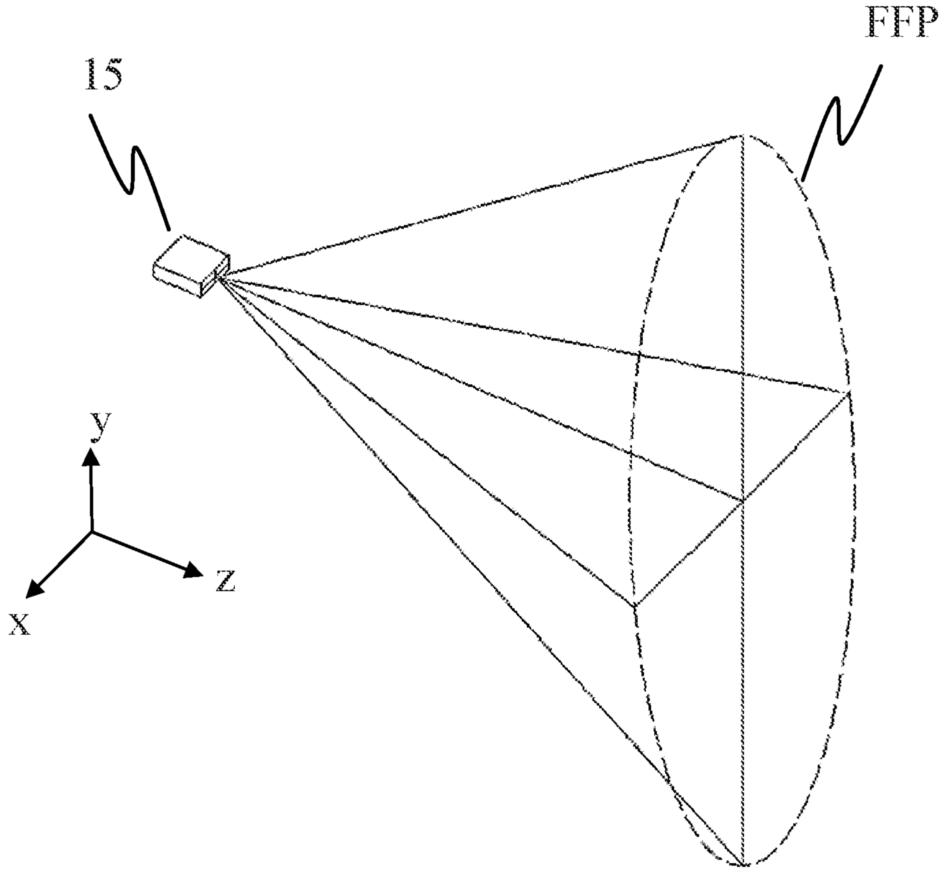
FIG. 7 illustrates a light distribution characteristic of a light emitter.

FIGS. 6A, 6B, and 6C are configuration diagrams of the light source 11. FIG. 7 illustrates a light distribution characteristic of a light emitter 15. The light emitted from the light emitter 15 is linearly polarized light, has different divergence angles in the x-axis direction and the y-axis direction, and thus possesses an elliptical section (FFP) on the xy section orthogonal to the z-axis direction. The light emitted from the light emitter 15 is collimated by a collimator lens 16 having the same focal length. Therefore, as illustrated in FIG. 6C, the light source 11 emits a collimated light beam 18 having an elliptical sectional shape with a short axis in the x-axis direction. By using an anamorphic collimator lens system, the light source 11 can emit a collimated light beam having a substantially circular sectional shape.

A half waveplate 17 may be placed behind the collimator lens 16 (on the side opposite to the light emitter 15) to control emitted polarized light. In this example, the light beam emitted from the light source 11 is a collimated light beam in a wavelength range of 520 to 540 nm from the semiconductor laser, but may be a collimated light beam obtained by combining the light beams from red, green, and blue semiconductor lasers. A photonics crystal laser or a light emitting diode may be used instead of the semiconductor laser.

Figure 8B:
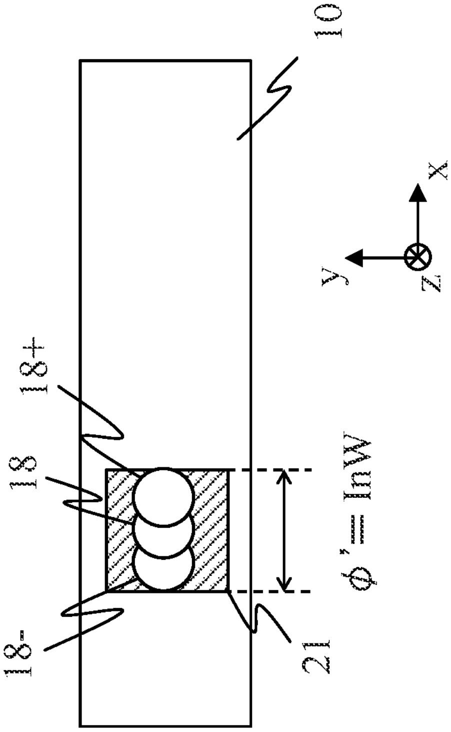
FIGS. 8A and 8B explain diffraction propagation condition.
Figure 8A:
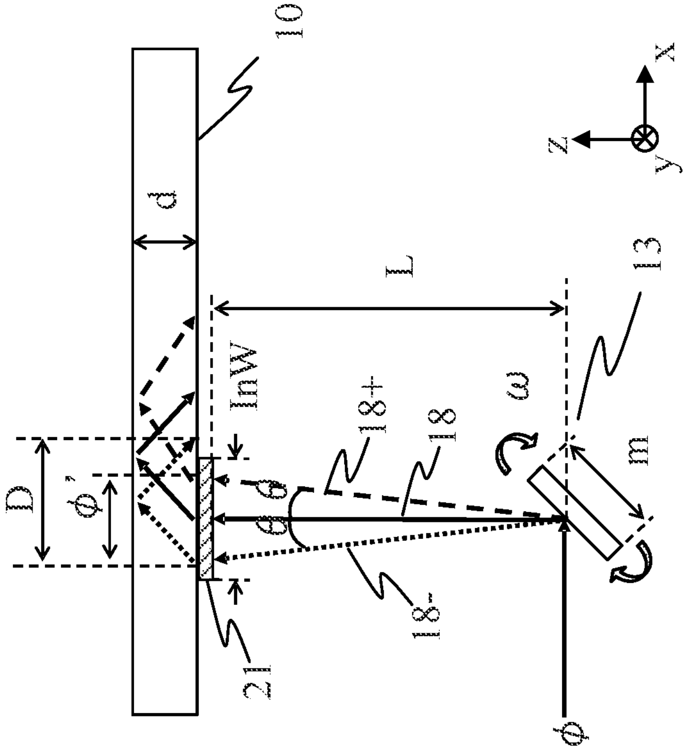

Referring now to FIGS. 8A and 8B, a description will be given of the diffraction propagation condition. FIGS. 8A and 8B explain diffraction propagation condition.

In this example, in a case where the mirror 13 tilts by an angle $\omega$ when light beams enter the mirror 13, the light beams (18−, 18+) reflected by the mirror 13 tilt by an angle of $2\omega$ ($=\theta$) relative to a collimated light beam 18. Separated light beams enter the incident deflector 21 as illustrated in FIG. 8B. A width Y' of the light beams separated on the incident deflector 21 over the entire angle of view is expressed by the following expression (1):

$$\varphi' = \varphi + 2 \times L \times \tan\theta \tag{1}$$

where $\varphi$ is a diameter of the light beam incident on the mirror 13, L is a distance between the reflective surface (exit surface) 13*a* of the mirror 13 from which the image light is emitted and an incident surface 21*a* of the incident deflector 21 which the image light enters, and θ is an exit angle of the image light from the mirror 13. In this example, the distance L is a distance (shortest length) between the center of the reflective surface 13*a* and the incident surface 21*a* of the incident deflector 21.

As illustrated in FIG. 8B, this example assumes that a width InW of the incident deflector 21 and the width φ' of the light beam separated on the incident deflector 21 at the entire angle of view are equal to each other. In a case where a light beam with a diameter larger than a diameter (effective diameter) m of the reflective surface of the mirror 13 enters the mirror 13, the light beam outside the area of the effective diameter m is not correctly guided and the effective diameter m of the mirror 13 becomes the diameter φ of the light beam incident on the mirror 13.

As described above, the light beam re-entering the incident deflector 21 is diffracted and propagated inside the light guide plate 10 by total reflection, but in a case where the diffracted light beam re-enters the incident deflector 21, it is diffracted again and is not properly propagated.

Accordingly, this example may satisfy the following inequality (2) so as to prevent the diffracted light beam from re-entering the incident deflector 21.

$$D/InW \geq 0.25 \tag{2}$$

where InW is a length in an image light propagating direction (x-axis direction) of the light guide plate 10 of the incident surface 21*a*, and D is a propagation distance of once total reflection of the light beam (18−) on the negative angle of view side.

The propagation distance D is expressed by the following equation (3):

$$D = 2 \times d \times \tan\theta c \tag{3}$$

where d is a length of the light guide plate 10 in a direction orthogonal to the incident surface 21*a*, and θc is a critical angle of the light guide plate 10.

Since the critical angle θc is obtained from the refractive index nd of the light guide plate 10 for the d-line (wavelength 587.6 nm), equation (3) can be expressed by equation (4) below:

$$D = 2 \times d \times \tan(\text{asin}(1/nd)) \tag{4}$$

By substituting equation (4) into inequality (2), inequality (2) is expressed by inequality (5) below:

$$2 \times d \times \tan(\text{asin}(1/nd))/InW \geq 0.25 \tag{5}$$

As described above, this example assumes that the width InW of the incident deflector 21 and the width φ' of the light beam separated on the incident deflector 21 at all angles of view are equal to each other. Accordingly, using equation (1), inequality (5) can be transformed into the following inequality (6):

$$L \leq (2 \times d \times \tan(asin(1/nd)) - 0.25\varphi)/(0.5 \times \tan\theta) \tag{6}$$

The distance L satisfying inequality (6) can realize an image display apparatus that can achieve both a reduced size and a wide viewing angle. More specifically, in a case where the distance L is longer than 0 mm and 5 mm or less, inequality (6) can be satisfied. The distance L may be 4 mm or less or 3 mm or less.

Inequality (6) may be simplified to the following inequality (6a):

$$0 < L/\varphi \leq 5 \tag{6a}$$

Figure 9B:
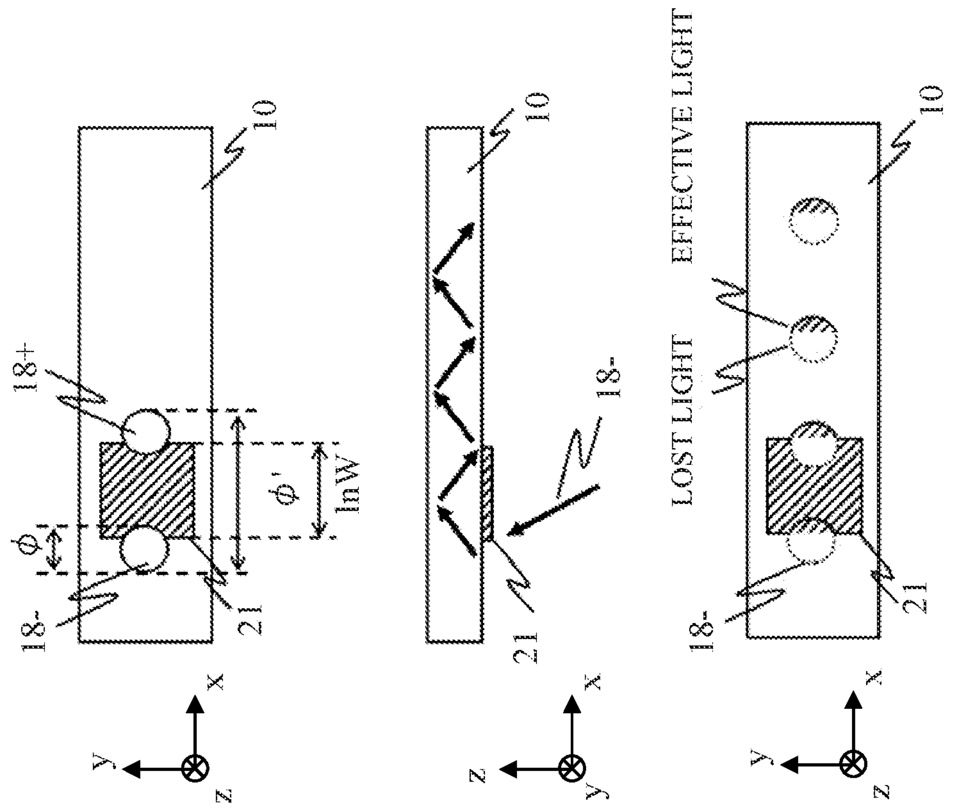
FIGS. 9A and 9B illustrate diffraction propagation condition.
Figure 9A:
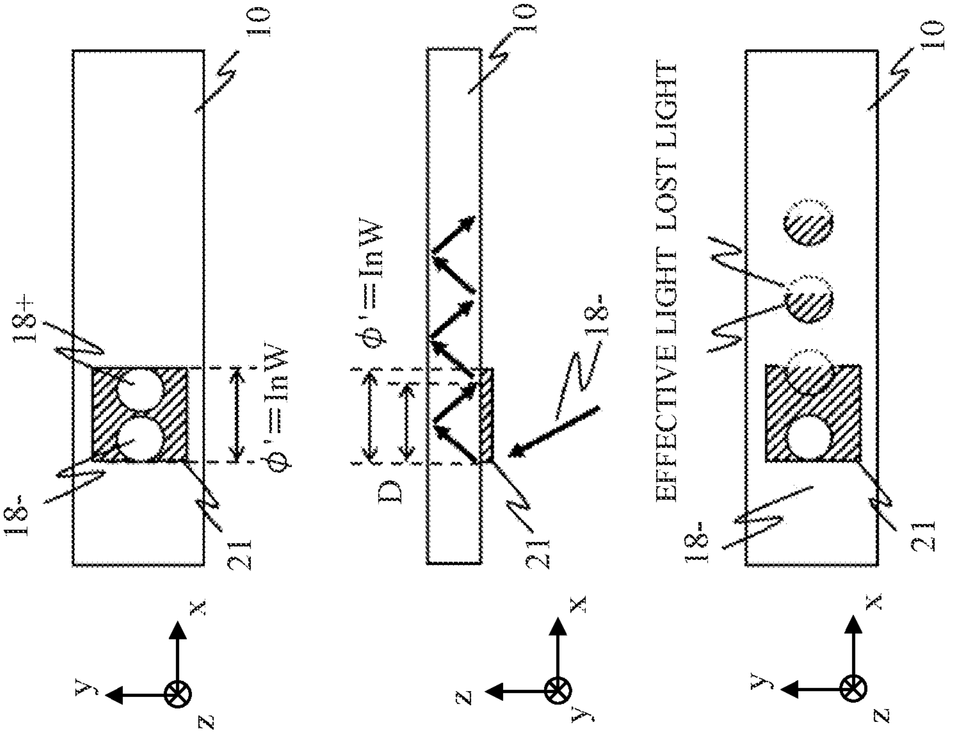

Although the light beam over the entire angle of view can be propagated even in a case where equation (5) is satisfied, part of the diffracted light beam re-enters the incident deflector 21 as illustrated in FIG. 9A and is not correctly guided. In order to efficiently propagate the light beam, the following inequality (7) may be satisfied:

$$2 \times d \times \tan(\text{asin}(1/nd))/InW \geq 0.5 \tag{7}$$

Considering the uniformity in the pupil SP, the following inequality (8) may be satisfied:

$$2 \times d \times \tan(\text{asin}(1/nd))/InW \geq 1.0 \tag{8}$$

As described above, the width InW of the incident deflector 21 and the width φ' of the light beam separated on the incident deflector 21 over the entire angle of view may equal to each other. As illustrated in FIG. 9B, part of the light beam at a certain angle of view re-enters the incident deflector 21 and is not correctly guided, but the light beam can be propagated. In that case, the width InW of the incident deflector 21, the width φ' of the light beams separated on the incident deflector 21 over the entire angle of view, and the diameter φ of the light beam incident on the mirror 13 may satisfy the following inequality (9):

$$\varphi' < InW + 2 \times \varphi \tag{9}$$

Although the light beam over the entire angle of view can be propagated even in a case where inequality (9) is satisfied, part of the diffracted light beam re-enters the incident deflector 21 and is not correctly guided as illustrated in FIG. 9A. In order to efficiently propagate the light beam, the following inequality (10) may be satisfied:

$$\varphi' \leq InW + \varphi \tag{10}$$

Considering the uniformity in the pupil SP, the following inequality (11) may be satisfied:

$$\varphi' \leq InW \tag{11}$$

A description will now be given of the viewing angle of the image display apparatus. Since the light beam propagates through the light guide plate 10 with its angle preserved by total internal reflection, the light beam needs to enter the incident deflector 21 at an angle equivalent to the viewing angle desired by the pupil SP. As illustrated in equation (1), in a case where the exit angle θ of the light reflected by the mirror 13 increases, the width φ' of the light beams separated on the incident deflector 21 over the entire angle of view increases, and it becomes difficult to satisfy the diffraction propagation condition. Shortening the distance L between the mirror 13 and the incident deflector 21 can suppress an increase in the width φ' of the light beams separated on the incident deflector 21 over the entire angle of view and can satisfy the diffraction propagation condition even if the exit angle θ is increased. Thereby, the image display apparatus can have a wide viewing angle. In this example, as illustrated in FIG. 2, the MEMS 20 is disposed to face a second surface 10*c* opposite to a first surface 10*b* of the light guide plate 10 which the light beam emitted from the light source 11 enters. Therefore, the light beam emitted from the light source 11 enters the light guide plate 10 from the first surface 10*b*, transmits through the light guide plate 10, the incident deflector 21, and the quarter waveplate 12, and enters the MEMS 20. This configuration can shorten the distance L between the mirror 13 and the incident deflector 21. In order to prevent light loss, the first surface 10*b* of the light guide plate 10, which the light beam emitted from the light source 11 enters, is coated with an antireflection film.

Another configuration will be described below.

Figure 10:
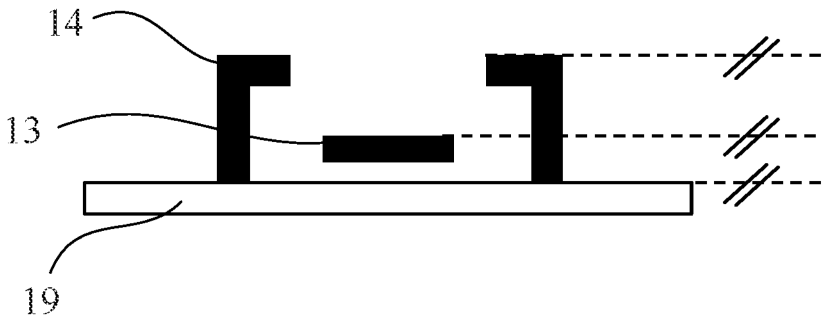
FIG. 10 illustrates a structure of MEMS.

In order to shorten the distance L between the mirror 13 and the incident deflector 21, the light beam emitted from the light source 11 may enter the MEMS 20 orthogonally (or substantially or approximately orthogonally) to the reflective surface of the mirror 13. That is, the mirror 13 may be disposed such that the reflective surface of the mirror 13 is substantially parallel to the incident surface 21*a* of the incident deflector 21 in a non-driven state (stationary state or non-energization state). Here, "substantially parallel" means that the parallelism between two surfaces is within ±2°. That is, the tilt angle of the reflective surface of the mirror 13 in the non-driven state relative to the incident surface 21*a* of the incident deflector 21 may be within ±2°. As illustrated in FIG. 10, since the reflective surface of the mirror 13 in the non-driven state and the exit surface of the exterior 14 or the substrate surface 19 are substantially parallel to each other, the parallelism between the exit surface of the exterior 14 or the substrate surface 19 and the incident surface 21*a* of the incident deflector 21 may be used.

The light beam emitted from the light source 11 may enter the incident deflector 21 orthogonally (or substantially or approximately orthogonally) to the incident surface 21*b* opposite to the incident surface 21*a* of the incident deflector 21. Considering the P-polarized light transmittance characteristic of the incident deflector 21, in this example, the light beam emitted from the light source 11 enters the incident surface 21*b* of the incident deflector 21 within a range of 10° relative to the normal to the incident surface 21*b* of the incident deflector 21.

The quarter waveplate 12 may be thin. The quarter waveplate 12 may be a retardation plate made of crystal or a film laminated substrate. In using the film laminated substrate, a higher refractive index of the material for the substrate can more effectively reduce the air conversion length and thus the distance L. More specifically, a material with a refractive index of 1.5 or more may be used.

Figure 11A:
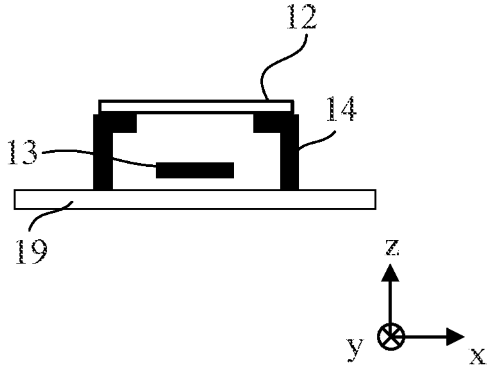
FIGS. 11A and 11B illustrate arrangements of waveplates.

The quarter waveplate 12 may be held using the exterior 14 as illustrated in FIG. 11A. The quarter waveplate 12 is disposed adjacent to an opening in the exterior 14, so that it also serves as a cover glass and can prevent foreign matters from entering the interior. As long as the quarter waveplate 12 is disposed adjacent to the opening of the exterior 14, the quarter waveplate 12 may be adhered to the exterior 14 with an adhesive, or may be held by a mechanical component such as a pressure spring.

Figure 11B:
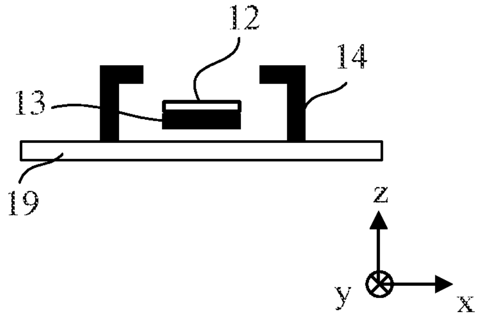

The quarter waveplate 12 may be formed on the reflective surface 13*a* of the mirror 13, as illustrated in FIG. 11B. Forming the quarter waveplate 12 on the reflective surface 13*a* eliminates the need to dispose a separate optical element, and can minimize the distance L. In this case, the quarter waveplate 12 is configured as a waveplate on a film made of polycarbonate or olefin resin.

Figure 12:
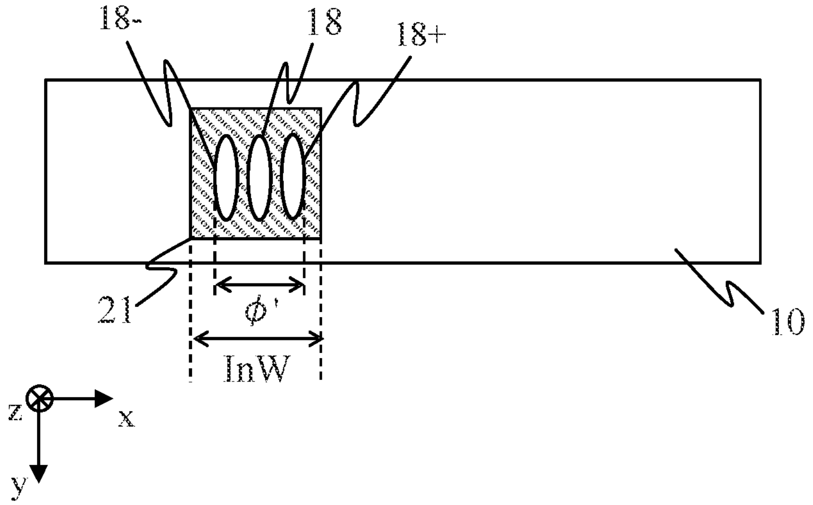
FIG. 12 illustrates a relationship between an incident deflector and an incident light beam.

As illustrated in FIG. 6C, the collimated light beam emitted from the light source 11 has an elliptical sectional shape. At this time, in a case where the light beam incident on the incident deflector 21 has also an elliptical sectional shape, the image light propagating direction (x-axis direction) of the light guide plate 10 and the minor axis direction of the elliptical shape may coincide with each other, as illustrated in FIG. 12. Thereby, the width φ' of the light beams over the entire angle of view separated on the incident deflector 21 can be made smaller than that using the circular light beams, so that the viewing angle becomes wider and the width InW of the incident deflector 21 can be reduced.

Example 2

This example is different from Example 1 in that a light beam emitted from the light source 11 is deflected once and then enters the light guide plate 10. This example will discuss only the configuration different from that of Example 1 and will omit a description of the common configuration.

Figure 13A:
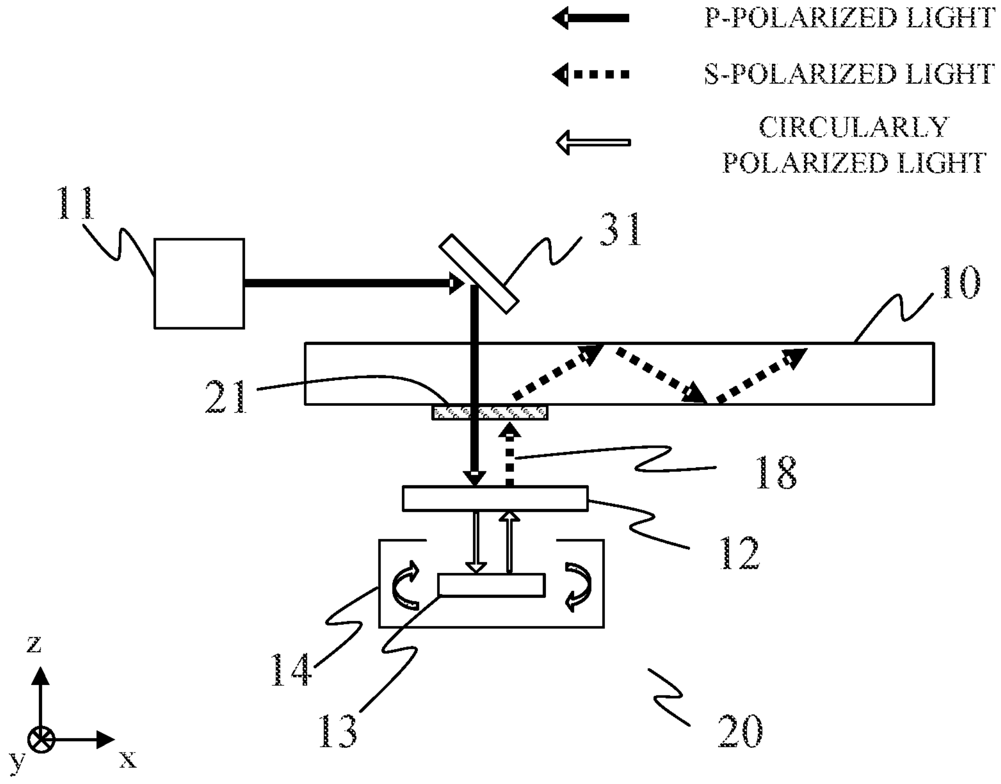
FIGS. 13A, 13B, and 13C are configuration diagrams of an image display apparatus according to Example 2.
Figure 13B:
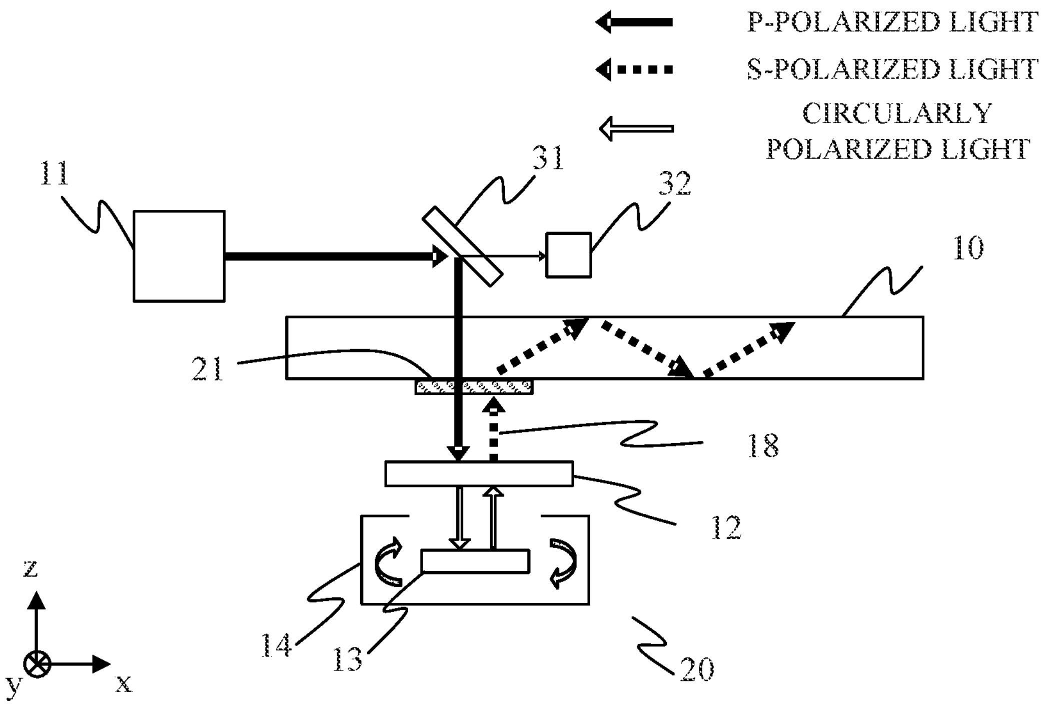
Figure 13C:
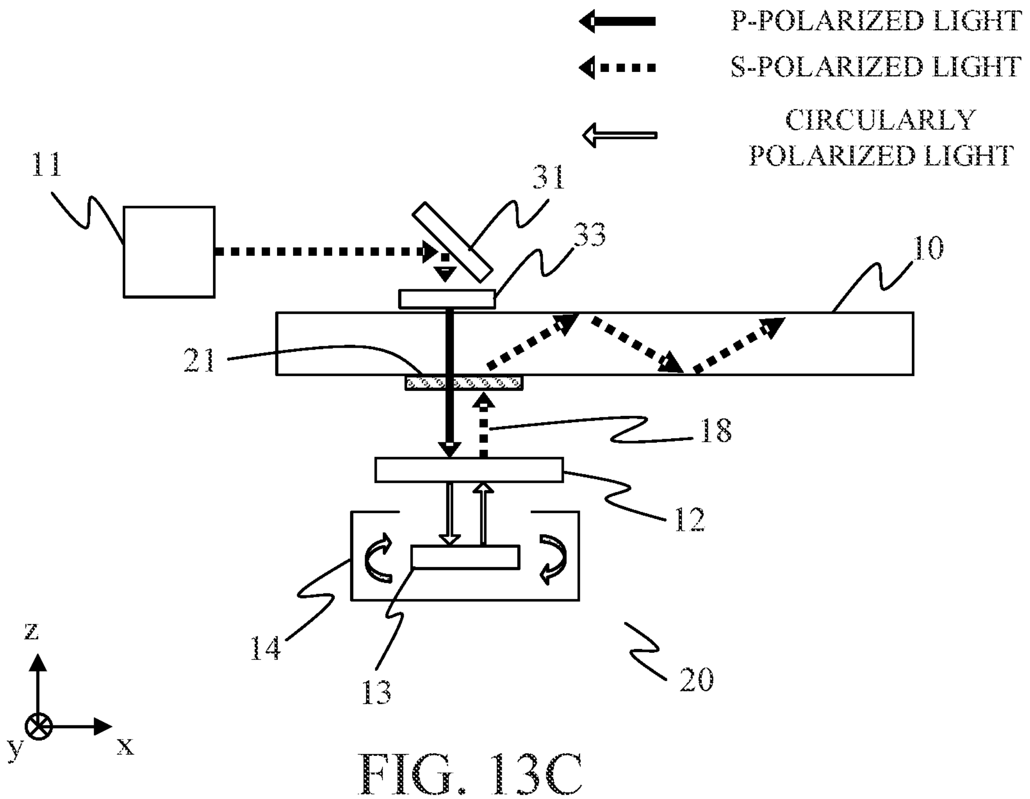

FIGS. 13A, 13B, and 13C are configuration diagrams of the image display apparatus according to this example. The image display apparatus according to this example includes a deflection element 31 in addition to the configuration of Example 1. Although the deflection element 31 is a metal mirror in this example, it may be a dielectric mirror or a Polarizing Beam Splitter (PBS) as long as it can deflect light toward the light guide plate 10.

In this example, the light beam emitted from the light source 11 enters the light guide plate 10 after being deflected by the deflection element 31. This example can make a length in a depth direction (z-axis direction) of the MEMS 20 by rotating the light source 11 around the y-axis smaller than that of Example 1.

As illustrated in FIG. 13B, a light receiver 32 configured to monitor information about the light source 11 may be disposed on the back surface of the deflection element 31. In this example, the light receiver 32 senses a light amount, but may sense the color. Disposing the light receiver 32 configured to monitor information about the light source 11 and performing feedback control can reduce variations in the light source 11 and improve the quality of the displayed image.

As illustrated in FIG. 13C, considering the reflectance characteristic of the deflection element 31, this example introduces the light beam emitted from the light source 11 to the deflection element 31 as S-polarized light, thereby securing high reflectance. In that case, a waveplate 33 may be disposed between the deflection element 31 and the light guide plate 10. The S-polarized light emitted from the deflection element 31 is rotated by 90° in phase by the waveplate 33 and enters the light guide plate 10 as P-polarized light.

Example 3

This example is different from Example 1 in that a light beam emitted from the light source 11 is deflected twice and then enters the light guide plate 10. This example will discuss only the configuration different from that of Example 1 and will omit a description of the common configuration.

Figure 14A:
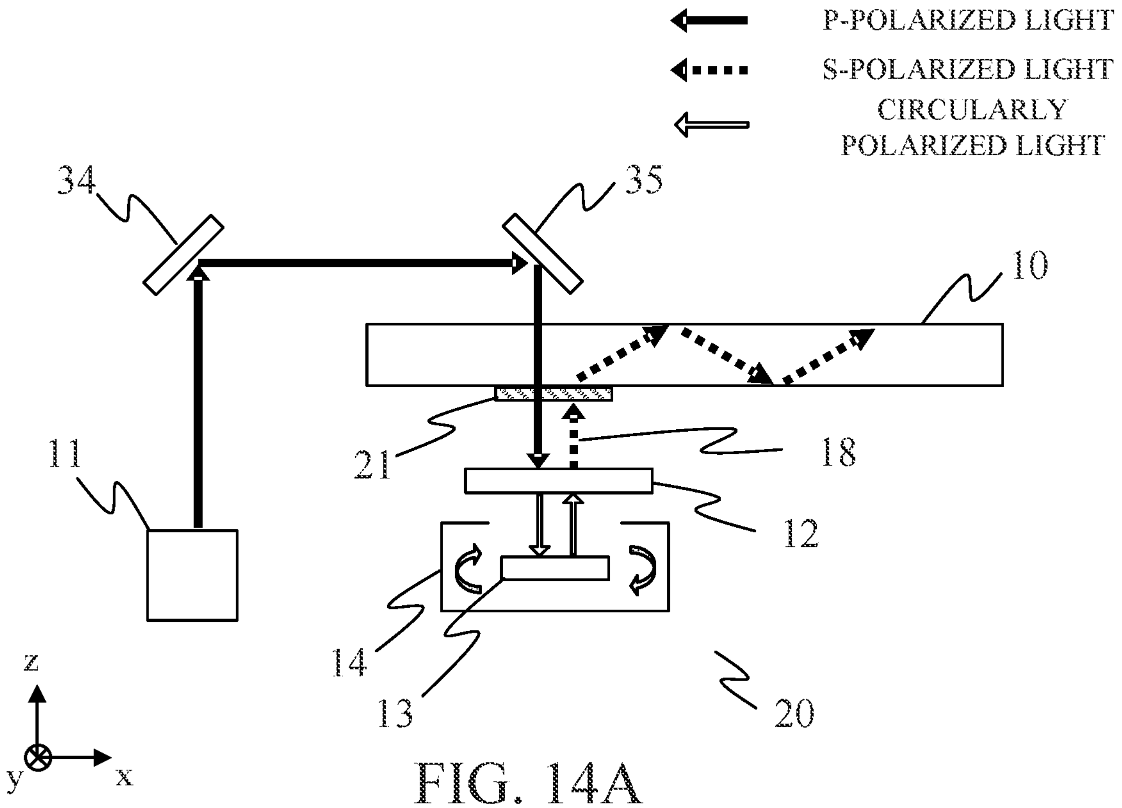
FIGS. 14A and 14B are configuration diagrams of an image display apparatus according to Example 3.
Figure 14B:
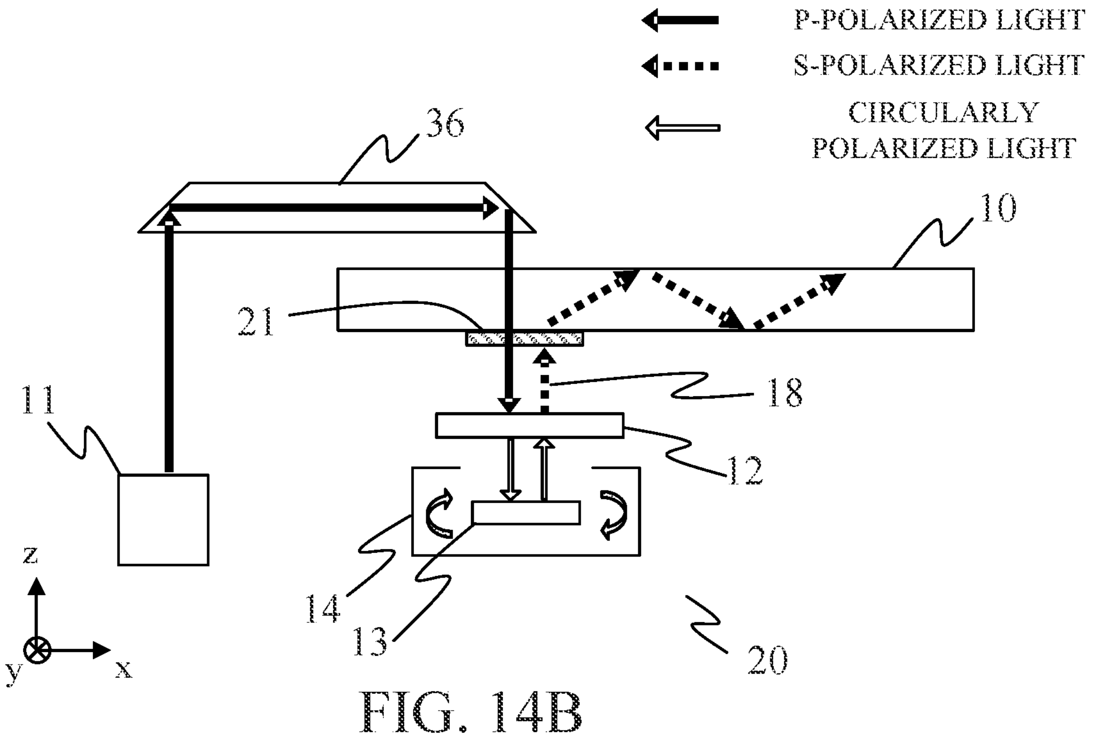

FIGS. 14A and 14B are configuration diagrams of an image display apparatus according to this example. The image display apparatus according to this example includes deflecting elements 34 and 35 in addition to the configuration of Example 1.

In this example, the light beam emitted from the light source 11 enters the light guide plate 10 after being deflected twice by the deflecting elements 34 and 35. In this example, by deflecting the light beam emitted from the light source 11 twice, the light source 11 can be accommodated in the frame 900, and the size of the entire apparatus can be reduced.

As illustrated in FIG. 14B, an element 36 having two reflective surfaces may be provided instead of the deflecting elements 34 and 35. In this case, selecting a glass material with a proper refractive index can deflect the light beam by total reflection.

Example 4

This example is different from Example 1 in that image light from the mirror 13 of the MEMS 20 enters the incident deflector 21 while tilting relative to the normal (line) of the incident surface 21*a* of the incident deflector 21. This example will discuss only the configuration different from that of Example 1 and will omit a description of the common configuration.

Figure 15:
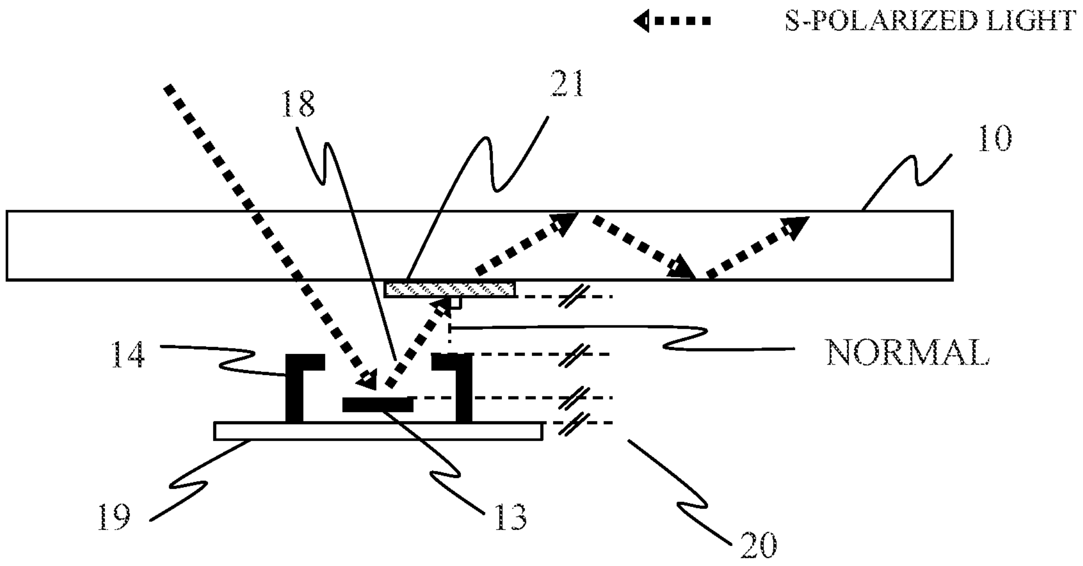
FIG. 15 is a configuration diagram of an image display apparatus according to Example 4.
Figure 16:
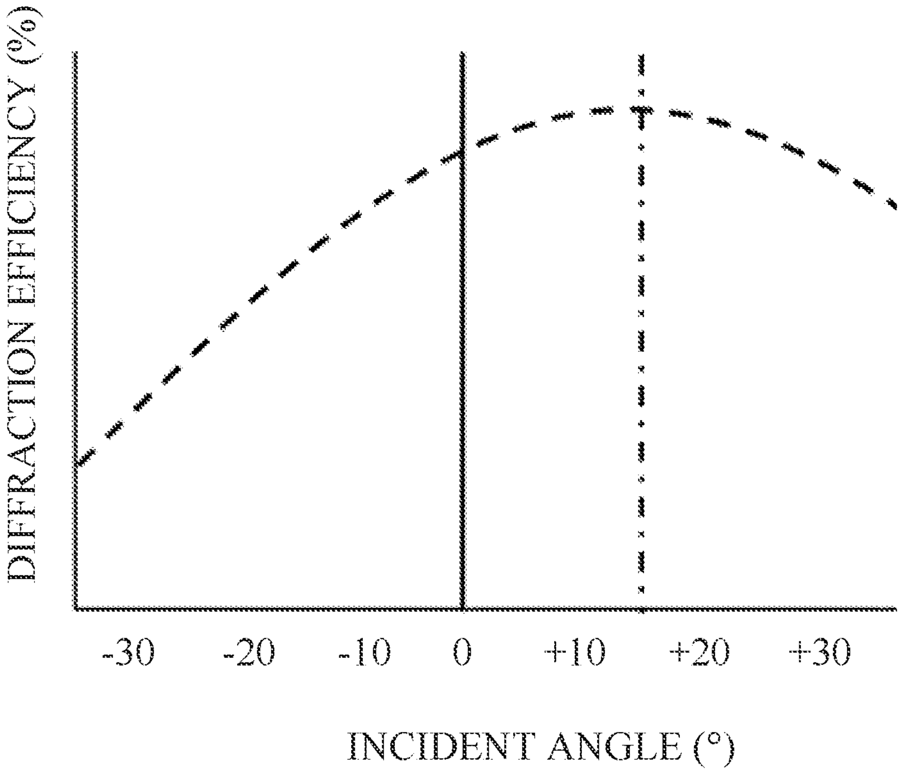
FIG. 16 illustrates an incident angle characteristic of an incident deflector.

FIG. 15 is a configuration diagram of an image display apparatus according to this example. FIG. 16 illustrates an incident angle characteristic of the incident deflector 21, illustrating the diffraction efficiency against the incident angle of the light beam incident on the incident deflector 21.

As illustrated in FIG. 16, in a case where the incident angle is 0° and the diffraction efficiency of the incident deflector 21 is not the maximum, the light beam can be propagated in the light guide plate 10 with high efficiency by introducing the light beam at an incident angle that maximizes the diffraction efficiency. It is unnecessary to introduce the light beam at the very incident angle that maximizes the diffraction efficiency, and the incident angle may be within 5° from the incident angle that maximizes the diffraction efficiency. At this time, the optical distance between the mirror 13 and the incident deflector 21 is longer than that in a case where the image light perpendicularly enters the incident surface 21*a* of the incident deflector 21. However, disposing the mirror 13 so that the reflective surface 13*a* of the mirror 13 in the non-driven state is substantially parallel to the incident surface 21*a* of the incident deflector 21 can suppress an increase in the optical distance by tilting the entire MEMS 20. The phrase "substantially parallel" means that the parallelism between two surfaces is within ±2°. Since the reflective surface 13*a* of the mirror 13 in the non-driven state and the exit surface of the exterior 14 or the substrate surface 19 are substantially parallel, the parallelism between the exit surface of the exterior 14 or the substrate surface 19 and the incident surface 21*a* of the incident deflector 21.

In this example, since the image light is emitted from the mirror 13 at an angle tilting relative to the normal line of the reflective surface 13*a* of the mirror 13, even light beams with the same angle of view, the light beam entering the mirror 13 and the light beam exiting from the mirror 13 do not match. That is, in this configuration, the incident light beam may not transmit through the incident deflector 21. In a case where the light beam does not have to transmit through the incident deflector 21, polarization control is unnecessary and no quarter waveplate 12 is necessary between the incident deflector 21 and the MEMS 20.

Example 5

This example is different from Example 1 in that a spatial light modulator (SLM) is used instead of a MEMS as an image generating element. This example will discuss only the configuration different from that of Example 1 and will omit a description of the common configuration.

Figure 17A:
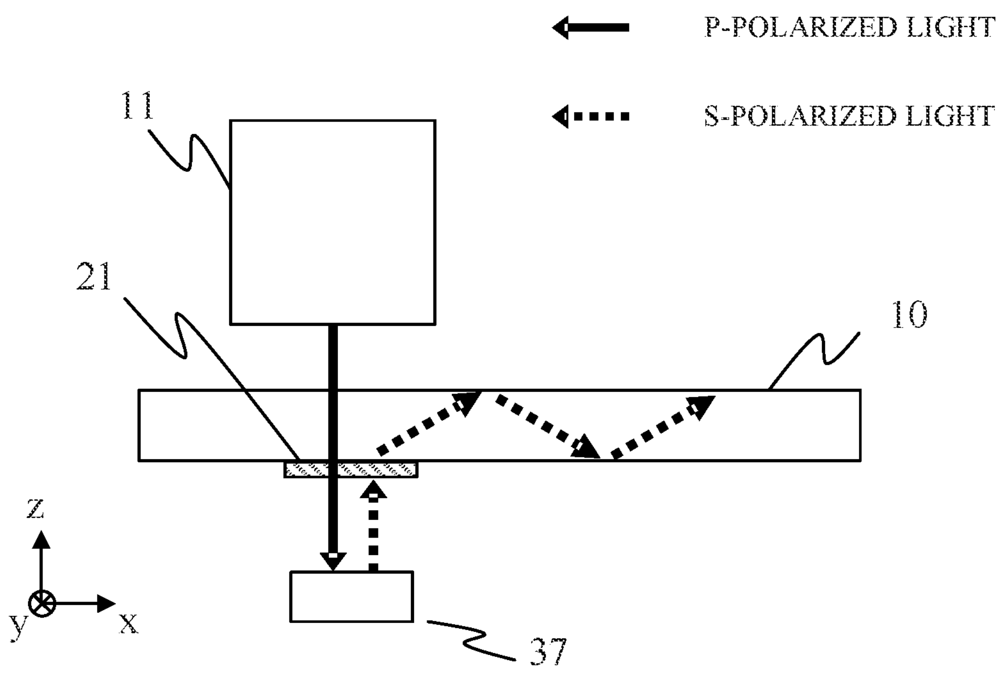
FIGS. 17A and 17B are configuration diagrams of an image display apparatus according to Example 5.
Figure 17B:
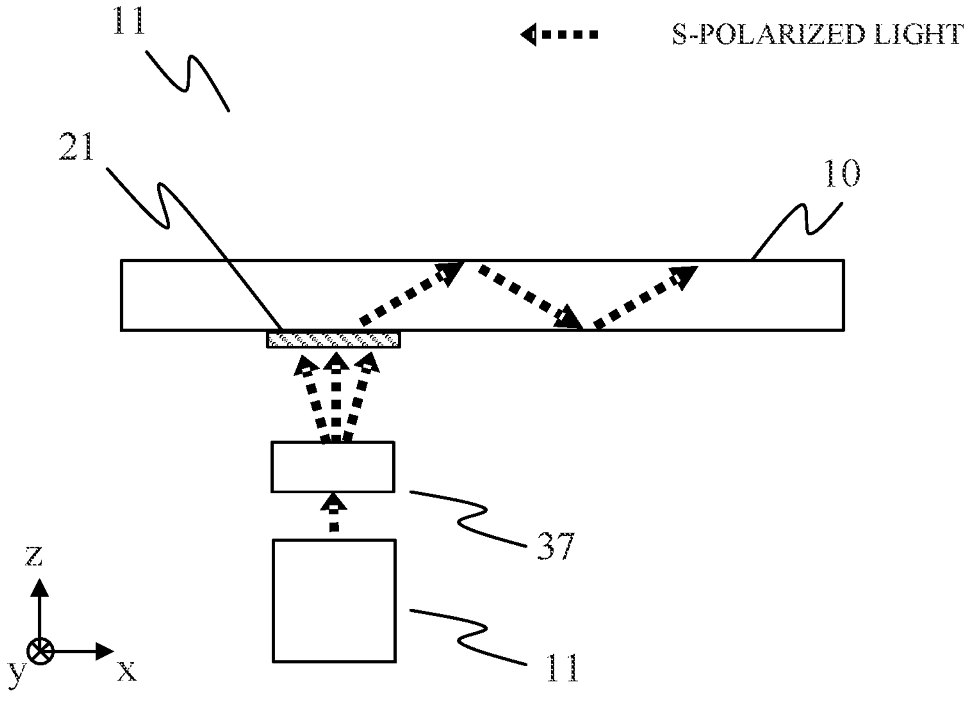
Figure 18:
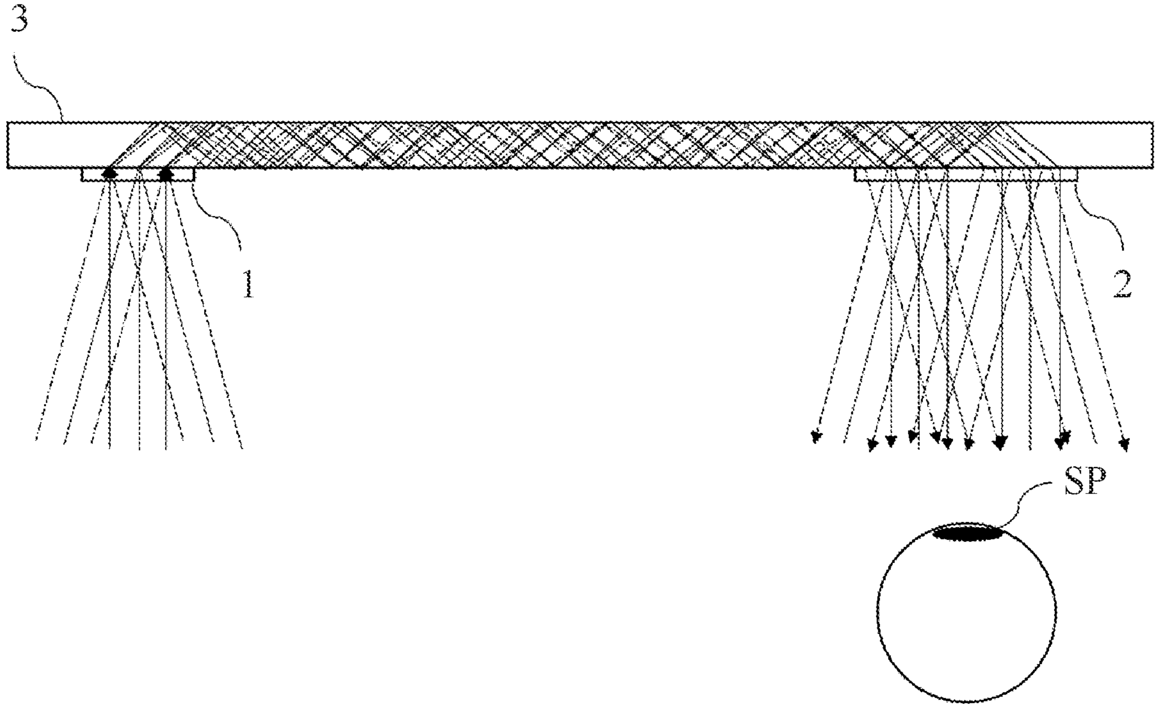
FIG. 18 is a conceptual diagram of light beams propagating in a conventional light guide plate.

FIGS. 17A and 17B are configuration diagrams of an image display apparatus according to this example. This example uses a spatial phase modulator 37 such as an optical phased array (OPA) as an image generating element.

The spatial phase modulator 37 is a device that changes (modulates) a light beam emitted from the light source 11 by electrically controlling the spatial distribution (amplitude, phase, polarization, etc.) of the light beam. More specifically, controlling a wavefront shape of the light beam incident on the spatial phase modulator 37 and changing the exit angle of the emitted image light can form image light for each angle of view. In a case where the spatial phase modulator 37 can control polarization, it is unnecessary to place a quarter waveplate between the light guide plate 10 and the spatial phase modulator 37.

As illustrated in FIG. 17B, in a case where the spatial phase modulator 37 is of a transmissive type, the light beam emitted from the light source 11 does not need to enter the spatial phase modulator 37 from the light guide plate 10 side, and a distance between the incident deflector 21 and the spatial phase modulator 37 can be further reduced.

TABLE 1 below summarizes various values of configurations that can be taken in each example. n1 is a refractive index of air, and n2 is a refractive index nd of the light guide plate 10 for the d-line.

TABLE 1

| | ① | ② | ③ | ④ | ⑤ | ⑥ | ⑦ | ⑧ | ⑨ | ⑩ |
|---|---|---|---|---|---|---|---|---|---|---|
| n1 | 1 | 1 | 1 | 1 | 1 | 1 | 1 | 1 | 1 | 1 |
| n2 | 1.46 | 1.46 | 1.6 | 1.7 | 1.7 | 1.7 | 1.9 | 1.6 | 1.9 | 1.9 |
| θc (°) | 43.2 | 43.2 | 38.7 | 36.0 | 36.0 | 36.0 | 31.8 | 38.7 | 31.8 | 31.8 |
| d (mm) | 1 | 1 | 1 | 1 | 1.3 | 0.75 | 1 | 1 | 0.6 | 0.6 |
| D (mm) | 1.9 | 1.9 | 1.6 | 1.5 | 1.9 | 1.1 | 1.2 | 1.6 | 0.7 | 0.7 |
| ϕ (mm) | 1.0 | 1.0 | 1.0 | 0.5 | 1.0 | 0.5 | 0.5 | 4.0 | 1.8 | 1.0 |

TABLE 1-continued

| | ① | ② | ③ | ④ | ⑤ | ⑥ | ⑦ | ⑧ | ⑨ | ⑩ |
|---|---|---|---|---|---|---|---|---|---|---|
| L (mm) | 5.0 | 3.0 | 1.2 | 1.0 | 1.0 | 0.8 | 0.6 | 5.0 | 1.0 | 0.5 |
| θ (°) | 5.0 | 8.0 | 15.0 | 25.0 | 25.0 | 20.0 | 30.0 | 12.0 | 30.0 | 30.0 |
| ϕ' (mm) | 1.9 | 1.8 | 1.6 | 1.4 | 1.9 | 1.1 | 1.2 | 6.1 | 3.0 | 1.6 |
| D/ϕ' | 1.0 | 1.0 | 1.0 | 1.0 | 1.0 | 1.0 | 1.0 | 0.26 | 0.25 | 0.5. |

This embodiment can provide an image display apparatus that can achieve both a reduced size and a wide viewing angle.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-146057, filed on Sep. 14, 2022, which is hereby incorporated by reference herein in its entirety.

What is claimed is:

1. An image display apparatus comprising:

a light source;

an image generating element configured to convert light from the light source into image light;

a light guide element configured to guide the image light to an observer; and a light guide unit configured to guide the image light to the light guide element, wherein the light guide element has a first surface and a second surface opposite to the first surface, and the image generating element is disposed to face the second surface of the light guide element, wherein the light from the light source enters the first surface, transmits through the light guide element and the light guide unit, and enters the image generating element to be converted into the image light, and the image light transmits through the light guide unit and enters the second surface, and wherein a distance between an exit surface of the image generating element for emitting the image light and an incident surface of the light guide unit which the image light enters is longer than 0 mm and equal to or shorter than 5 mm.

2. The image display apparatus according to claim 1, wherein the following inequality is satisfied:

$$2 \times d \times \tan(a\sin(1/nd))/InW \geq 0.25$$

where InW is a length of the incident surface in a direction in which the light guide element propagates the image light, d is a length of the light guide element in a direction orthogonal to the incident surface, and nd is a refractive index for d-line of the light guide element.

3. The image display apparatus according to claim 1, wherein the light guide unit includes a diffraction element having polarization selectivity.

4. The image display apparatus according to claim 3, wherein a light beam emitted from the light source enters the light guide unit at an incident angle within 10° relative to a normal to a surface of the light guide unit facing the incident surface.

5. The image display apparatus according to claim 3, wherein the image light tilts relative to a normal of the incident surface and enters the incident surface at an incident angle within 5° from light having an incident angle that maximizes diffraction efficiency of the light guide unit.

6. The image display apparatus according to claim 1, further comprising an antireflection film formed on the first surface.

7. The image display apparatus according to claim 1, a light beam emitted from the light source enters the light guide element from the first surface after an optical path of the light beam is deflected.

8. The image display apparatus according to claim 1, further comprising a quarter waveplate disposed between the second surface and the image generating element, and wherein a light beam from the light source enters the first surface, transmits through the light guide element, the light guide unit, and the quarter waveplate, and enters the image generating element to be converted into the image light, and the image light transmits the quarter waveplate and the light guide unit and enters the second surface.

9. The image display apparatus according to claim 8, wherein the image generating element includes a mirror and a protective member configured to protect the mirror, and wherein the quarter waveplate is held by the protective member.

10. The image display apparatus according to claim 8, wherein the image generating element includes a mirror, and wherein the quarter waveplate is formed on the mirror.

11. The image display apparatus according to claim 1, wherein the image generating element is a scan type mirror.

12. The image display apparatus according to claim 11, wherein the following inequality is satisfied:

$$0 < L/\varphi \leq 5$$

where φ is a diameter of a reflective surface of the scan type mirror for reflecting a light beam emitted from the light source, and L is a distance between a center of the reflective surface and the incident surface.

13. The image display apparatus according to claim 1, wherein the image generating element includes a mirror, and wherein the mirror is disposed so that a tilt angle of a reflective surface of the mirror in a non-driven state relative to the incident surface is within 2°.

14. The image display apparatus according to claim 1, wherein a light beam incident on the light guide unit has an elliptical sectional shape, and wherein a minor axis direction of the light beam incident on the light guide unit coincides with a direction in which the light guide element propagates the image light.

15. The image display apparatus according to claim 1, wherein a distance between the exit surface and the incident surface is 4 mm or less.

16. The image display apparatus according to claim 1, wherein a distance between the exit surface and the incident surface is 3 mm or less.

* * * * *